(12) United States Patent
Thomasson et al.

(10) Patent No.: US 8,953,801 B2
(45) Date of Patent: Feb. 10, 2015

(54) SYSTEM AND METHOD FOR MULTICASTING IPSEC PROTECTED COMMUNICATIONS

(75) Inventors: John K. Thomasson, Sandy, UT (US); Neil R. Terry, Cedar Hills, UT (US); Matthew M. Davis, American Fork, UT (US); Myron L. Mosbarger, Orem, UT (US)

(73) Assignee: Hughes Networks Systems, LLC, Germantown, MD (US)

( * ) Notice: Subject to any disclaimer, the term of this patent is extended or adjusted under 35 U.S.C. 154(b) by 0 days.

(21) Appl. No.: 13/449,680

(22) Filed: Apr. 18, 2012

(65) Prior Publication Data

US 2012/0201382 A1     Aug. 9, 2012

Related U.S. Application Data

(62) Division of application No. 11/337,038, filed on Jan. 19, 2006, now Pat. No. 8,176,317.

(51) Int. Cl.
*H04K 1/00* (2006.01)
*H04L 29/06* (2006.01)

(52) U.S. Cl.
CPC .......... *H04L 63/0428* (2013.01); *H04L 63/065* (2013.01); *H04L 63/164* (2013.01)
USPC ................. 380/255; 726/14; 726/5; 713/168; 713/160; 713/153; 709/226

(58) Field of Classification Search
CPC ........ H04L 9/08; H04L 9/0822; H04L 63/064
USPC ......... 380/255, 278, 277, 200; 713/160–171; 726/5–14
See application file for complete search history.

(56) References Cited

U.S. PATENT DOCUMENTS 6,195,751 B1     2/2001    Caronni et al.
6,330,671 B1 *  12/2001    Aziz ............................. 713/163
(Continued)

FOREIGN PATENT DOCUMENTS

WO      2004/025895      3/2004

OTHER PUBLICATIONS

Howarth M.P., Dynamics of Key Management in Secure Satellite Multicast, Feb. 2004, IEEE, vol. 22, pp. 308-319.*

(Continued)

*Primary Examiner* — Dede Zecher
*Assistant Examiner* — Viral Lakhia
(74) *Attorney, Agent, or Firm* — K&L Gates LLP (57) ABSTRACT

A system and method is provided which allows multicast communications encrypted using IPSec protocol to be received by receivers in a network. In order to allow the receivers to receive the encrypted multicast communication, the address information of the received multicast communication is modified to appear as a unicast communication being transmitted directly to the address of the receiver, such that the receiver may then decrypt the received multicast communication using IPSec decryption capabilities or may, alternatively, forward the received multicast communication in its encrypted state to other devices. The system and method further provide IPSec encryption key delivery to the receiver using an encrypted markup language file. Multiple keys may also be generated for a given IP address of a receiver with each key being generated for a particular multicasting hierarchical classification.

22 Claims, 4 Drawing Sheets

(56) References Cited

U.S. PATENT DOCUMENTS

| | | | |
|---|---|---|---|
| 6,385,647 B1 | 5/2002 | Willis et al. | |
| 6,606,706 B1 | 8/2003 | Li | |
| 6,640,251 B1 | 10/2003 | Wiget et al. | |
| 6,810,413 B1 | 10/2004 | Rajakarunanayake et al. | |
| 6,813,714 B1 * | 11/2004 | Hardjono et al. | 726/14 |
| 6,816,966 B1 | 11/2004 | Gupta et al. | |
| 6,901,512 B2 * | 5/2005 | Kurn et al. | 713/164 |
| 6,915,437 B2 | 7/2005 | Swander et al. | |
| 6,940,814 B1 | 9/2005 | Hoffman | |
| 6,963,972 B1 * | 11/2005 | Chang et al. | 713/153 |
| 7,016,351 B1 | 3/2006 | Farinacci et al. | |
| 7,031,736 B2 | 4/2006 | Le et al. | |
| 7,106,735 B2 | 9/2006 | Yagyu et al. | |
| 7,107,464 B2 * | 9/2006 | Shapira et al. | 726/15 |
| 7,171,685 B2 * | 1/2007 | Batra et al. | 726/14 |
| 7,310,809 B2 | 12/2007 | Peterka | |
| 7,334,125 B1 | 2/2008 | Pellacuru | |
| 7,359,380 B1 | 4/2008 | Maufer et al. | |
| 7,366,894 B1 | 4/2008 | Kalimuthu et al. | |
| 7,424,019 B1 | 9/2008 | Kopelman et al. | |
| 7,447,901 B1 | 11/2008 | Sullenberger et al. | |
| 7,453,831 B2 | 11/2008 | Dorenbosch et al. | |
| 7,463,637 B2 * | 12/2008 | Bou-Diab et al. | 370/401 |
| 7,509,491 B1 | 3/2009 | Wainner et al. | |
| 7,509,639 B2 * | 3/2009 | Worley, Jr. | 718/1 |
| 7,539,313 B1 * | 5/2009 | Hardjono et al. | 380/278 |
| 7,587,591 B2 | 9/2009 | Lebovitz et al. | |
| 7,702,904 B2 * | 4/2010 | Suzuki et al. | 713/163 |
| 7,739,496 B2 | 6/2010 | Jacobs | |
| 7,774,597 B2 * | 8/2010 | Narayanan | 713/163 |
| 7,907,733 B2 | 3/2011 | Cho et al. | |
| 8,015,595 B2 * | 9/2011 | Benbrahim | 726/4 |
| 8,045,713 B2 * | 10/2011 | Lain et al. | 380/277 |
| 8,346,929 B1 * | 1/2013 | Lai | 709/226 |
| 8,365,293 B2 * | 1/2013 | Brown et al. | 726/26 |
| 2003/0039361 A1 | 2/2003 | Hawkes et al. | |
| 2003/0110169 A1 | 6/2003 | Zuili et al. | |
| 2003/0233540 A1 | 12/2003 | Banerjee et al. | |
| 2004/0054899 A1 * | 3/2004 | Balfanz et al. | 713/168 |
| 2004/0078577 A1 | 4/2004 | Feng et al. | |
| 2004/0187030 A1 | 9/2004 | Edney et al. | |
| 2005/0018853 A1 * | 1/2005 | Lain et al. | 380/277 |
| 2005/0044197 A1 * | 2/2005 | Lai | 709/223 |
| 2005/0066173 A1 | 3/2005 | Bergh et al. | |
| 2005/0076207 A1 | 4/2005 | Park et al. | |
| 2005/0131583 A1 * | 6/2005 | Ransom | 700/295 |
| 2005/0144437 A1 | 6/2005 | Ransom et al. | 713/151 |
| 2005/0195975 A1 * | 9/2005 | Kawakita | 380/30 |
| 2005/0289644 A1 * | 12/2005 | Wray | 726/5 |
| 2006/0095770 A1 * | 5/2006 | Baylis et al. | 713/171 |
| 2006/0230266 A1 * | 10/2006 | Maes | 713/168 |
| 2006/0233166 A1 * | 10/2006 | Bou-Diab et al. | 370/389 |
| 2006/0236096 A1 * | 10/2006 | Pelton et al. | 713/155 |
| 2007/0101435 A1 * | 5/2007 | Konanka et al. | 726/27 |
| 2007/0143225 A1 | 6/2007 | Hamilton et al. | |
| 2007/0143600 A1 * | 6/2007 | Kellil et al. | 713/163 |
| 2008/0019528 A1 * | 1/2008 | Kneissler | 380/279 |
| 2008/0107272 A1 * | 5/2008 | Carmeli et al. | 380/278 |
| 2009/0225984 A1 * | 9/2009 | Weber | 380/270 |

OTHER PUBLICATIONS

Proceedings of the Forty-Ninth Internet Engineering Task Force—Hosted by Cisco and Qualcomm, San Diego, CA, USA—Dec. 10-15, 2000. Compiled and Edited by Jacob Munoz and Natalia Syracuse (Corporation for National Research Initiatives, 1895 Preston White Drive, Suite 100, Reston, Virginia 20191.

Pekka Pessi—Proceedings of Helsinki University of Technology Seminar on Network Security 1995, A Practical Cryptographic Approach, Chapter 3, Secure Multicast.

Minutes—IRTF Smug Meeting—Mar. 15-16, 1999; Ran Canetti, D. Balenson, G. Tsudik, Y. Shavitt, I. Monga, M. Kadansky, Thomas Hardjono.

* cited by examiner

SYSTEM AND METHOD FOR MULTICASTING IPSEC PROTECTED COMMUNICATIONS

PRIORITY CLAIM

This application is a divisional application of U.S. patent application Ser. No. 11/337,038 filed on Jan. 19, 2006, the entire disclosures of which are hereby incorporated by reference in their entirety.

BACKGROUND

The present disclosure relates generally to the multicast distribution of content and more particularly to the multicast distribution of IPSec-encrypted content.

It is well established that computers can communicate across local or wide area networks, the Internet and wireless networks. Internet Protocol (IP) provides a hierarchical, hardware-independent addressing system for delivering data and communications between computers and other devices on a routed network. Each network adapter that is present in a computer or other device in a TCP/IP network has a unique IP address, where an IP header in data packets transmitted in the network include source and destination address information Multicasting is the delivery of information to a group of devices on the network simultaneously, where only those devices intended to receive a specified multicast transmission (e.g., by monitoring the multicast packet address header) accept the multicast transmission. Those devices on the network not intended to receive the multicast transmission discard it when received. By comparison with multicast transmissions, conventional point-to-point delivery between two devices is referred to unicast transmission.

A one-to-many or many-to-many Internet Protocol (IP) application involves one or multiple sources sending IP messages to multiple receivers. Exemplary applications include the transmission of corporate messages to employees, communication of stock quotes to brokers, video and audio conferencing for remote meetings and telecommuting, remote training, content-on-demand and providing web site information. IP multicast protocol efficiently supports one-to-many or many-to-many applications by allowing a source to send a single copy of a message to multiple receivers. IP multicast is more efficient than a point-to-point unicast protocol that requires the source to send an individual copy of a message to each receiver separately, thereby limiting the number of receivers by the bandwidth available to the sender. IP multicast is also more efficient than a broadcast protocol that sends one copy of a message to every node on the network even though many of the nodes may not want the message. IP multicast protocol is applicable not only to wired networks, but also wireless networks. For example, in wireless network, link level multicasting allows several terminals to receive data sent over a single air interface.

It is also well known that satellite receivers and transmitters can be used to transfer high volumes of digital data over a network. Satellite transmissions provide an efficient medium for communicating multicast transmissions through an air interface to multiple receivers or sites throughout a geographical area at the same time. Inherent to that advantage is that all receivers within the footprint or range of the satellite transmissions can receive such transmissions. There is thus a need to provide secure, encrypted multicast transmissions over satellite communications to only allow those receivers intended to receive the multicast transmission access to underlying content in the multicast transmission and prevent unauthorized receivers from accessing the underlying content Internet Protocol Security (IPSec) is an architecture and related Internet key exchange (IKE) protocol, described by IETF RFCs 2401-2409 which are hereby incorporated by reference, that provides a robust security protocol used on TCP/IP networks. IPSec provides confidentiality, access control, authentication, data integrity and replay protection services for IP level communications. IPSec provides the benefit of encryption-based security to any network application, regardless of whether the application is security-aware. However, IPSec requires the protocol stacks of both source and destination devices to support IPSec. IPSec uses a number of encryption algorithms and key distribution techniques that are dependent upon unicast point-to point transmissions between two devices. While IPSec is ideal for providing security between network devices, such as routers, the required unicast transmission prevents the IPSec protocol from being implemented to encrypt multicast satellite transmissions being sent to multiple receivers.

Prior attempts to secure multicast satellite transmissions required using specialized scrambling algorithms and hardware at the receiver to decrypt encrypted multicast satellite transmissions, such as the common scrambling algorithm (DVB-CSA) and common interface (DVB-CI) used in Digital Video Broadcasting (DVB). These prior attempts also required the incoming transmission to be decrypted as it was received and did not allow the multicast satellite transmissions' to be forwarded on in their encrypted state. There is clearly a need to overcome these and other limitations in the prior art by providing a system and method for utilizing IPSec protocol to encrypt multicast communications.

SUMMARY

According to a feature of the disclosure, a system and method is provided which allows multicast communications encrypted using IPSec protocol to be received by receivers in a network. In order to allow the receivers to receive the encrypted multicast communication, the address information of the received multicast communication is modified to appear as a unicast communication being transmitted directly to the address of the receiver. The receiver may then decrypt the received multicast communication using IPSec decryption capabilities or may, alternatively, forward the received multicast communication in its encrypted state to other devices. A receiver may correspond to addressable computer systems as defined herein this disclosure. Further, the receiver may be the ultimate destination for the encrypted content or may, alternatively, may also be acting as a data router to forward the content to another destination on the network.

In one aspect of the disclosure, a keyserver and gateway are provided on the transmission side of the satellite network for respectively assigning IPSec encryption keys and encrypting multicast communications using the assigned encryption keys. The assigned encryption keys are communicated to selected receivers on the receiving side of the satellite network for subsequently decrypting the encrypted multicast communications being transmitted. In another aspect of the disclosure, assigned keys are placed into a markup language file (e.g., XML) and encrypted prior to being communicated to the receivers, such that the receivers decrypt the encrypted markup language file using a predetermined key or algorithm in order to extract the assigned keys from the markup language file.

In another aspect of the disclosure, multiple keys are generated for a given IP address of a receiver with each key being generated for a particular multicasting hierarchical classification. For example, a hierarchy of the IP address, broadcast channels and broadcast events can be established by assigning different respective keys for each of the IP address, channels and events. In this way, access to content directed to the IP address in general, using multicast communication, can appear within separate channels of the multicast communication, and can separate content to appear in events within each channel of the multicast communication and be controlled using the respectively assigned keys for such content. All keys may be extant on a receiver at a given time, where only one of the keys is used at any given time to encrypt the multicast communication depending upon whether the content in the multicast communication is directed to the IP address, channels or events. Since a receiver possesses the set of possible keys for all or a portion of the hierarchy, transitions between multicast communications being encrypted with different keys will appear seamless at the receiver resulting in no loss in communication.

For purposes of summarizing the disclosure and the advantages achieved over the prior art, certain advantages of the disclosure have been described herein. Of course, it is to be understood that not necessarily all such advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other advantages as may be taught or suggested herein. All of these embodiments are intended to be within the scope of the disclosure herein disclosed, the disclosure not being limited to any particular preferred embodiment disclosed.

Additional features and advantages are described herein, and will be apparent from the following Detailed Description and the figures.

BRIEF DESCRIPTION OF THE FIGURES

The above-mentioned features and objects of the present disclosure will become more apparent with reference to the following description taken in conjunction with the accompanying drawings wherein like reference numerals denote like elements and in which.

DETAILED DESCRIPTION

Figure 1:
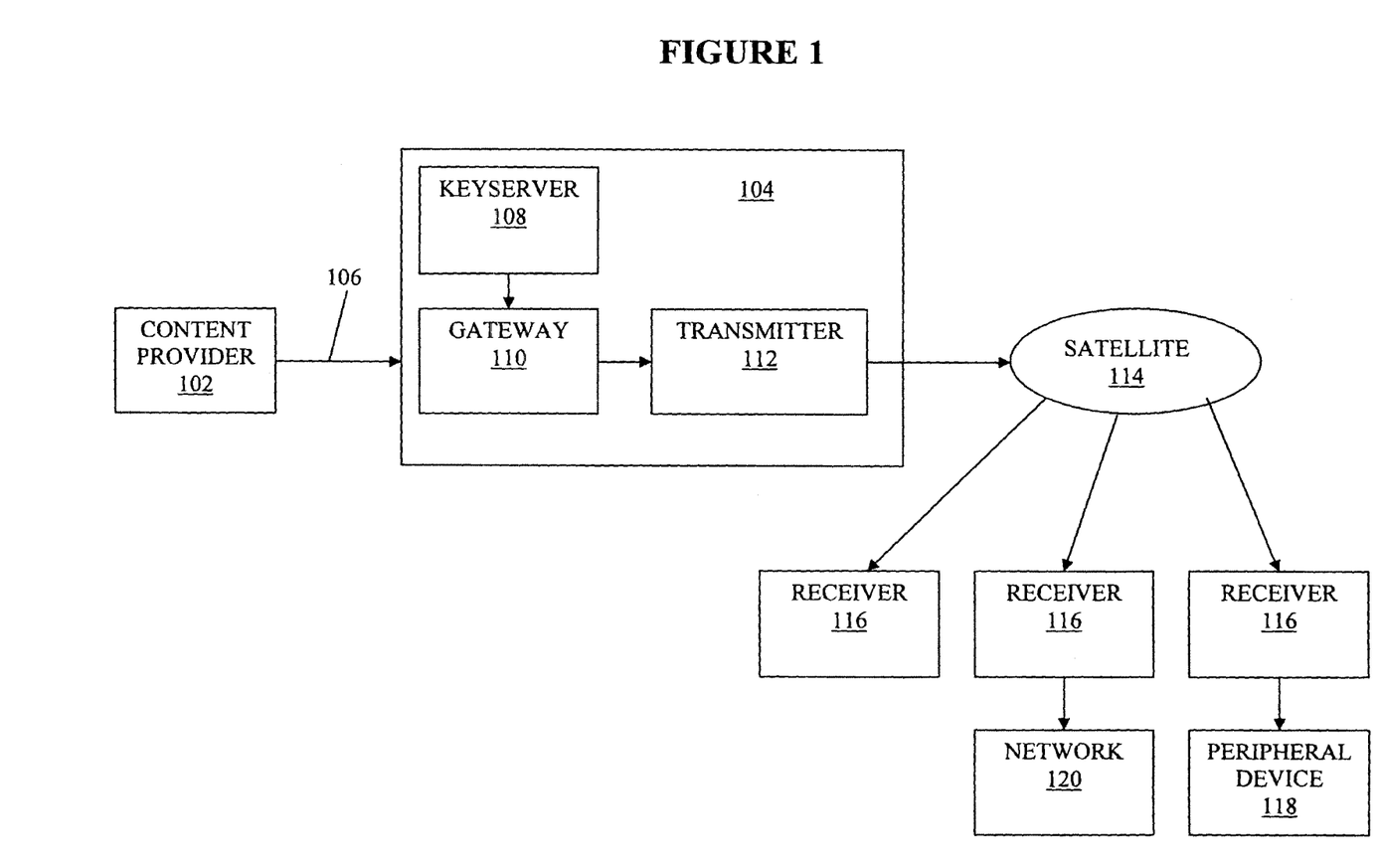
FIG. 1 illustrates an exemplary satellite communications network in accordance with the present disclosure.

The present disclosure teaches a novel system and method for allowing multicast communications encrypted using IPSec protocol to be received by receivers in a satellite network. In one embodiment as described hereinafter and throughout this disclosure, the system and method will employ IPSec-encrypted communications transmitted in a satellite network. However, it is understood that the present system and method can be utilized with any IPSec-encrypted multicast communication through any type of transmission. Referring now to FIG. 1, a block schematic illustration of an IPSec satellite communications network 100 is provided. A content provider 102, such as an Internet service provider or the like, generates content in an IP multicast communication. The content may include multimedia, video, audio, text, images, data, address information, header information, control information or any other type of information known or capable of being included within an IP multicast communication packet. The content provider 102 is communicatively connected to a network operations center 104 through the Internet 106 or another type of network connection capable of delivering IP packets, including but not limited to a local area network (LAN), wide area network (WAN) or other communication network, or may comprise a wireless connection, such as a WLAN, WiFi, WAP, WiMAX, Bluetooth, COMA, WCDMA, GSM, COPO, POC, PHS, TDMA, FLEX, satellite or other wireless transmission, a modem connection, etc.

In one embodiment, the network operations center 104 includes a keyserver 108 for assigning an IPSec encryption key and a gateway 110 for using the assigned IPSec encryption key to encrypt the IP multicast communication. The network operations center 104 further includes a satellite transmitter 112 for transmitting the encrypted multicast communication to a satellite 114 for relaying the encrypted multicast communication to at least one receiver 116. In alternative embodiments, it is understood that the keyserver 108 and gateway 110 may be located at content provider 102 or at any location between the content provider 102 and network operations center 104. The multicast communication may be intended to be utilized by the receiver 116 itself or may, alternatively, be routed or otherwise forwarded on to a peripheral device 118 or network 120 communicatively connected to the receiver 116.

Figure 2:
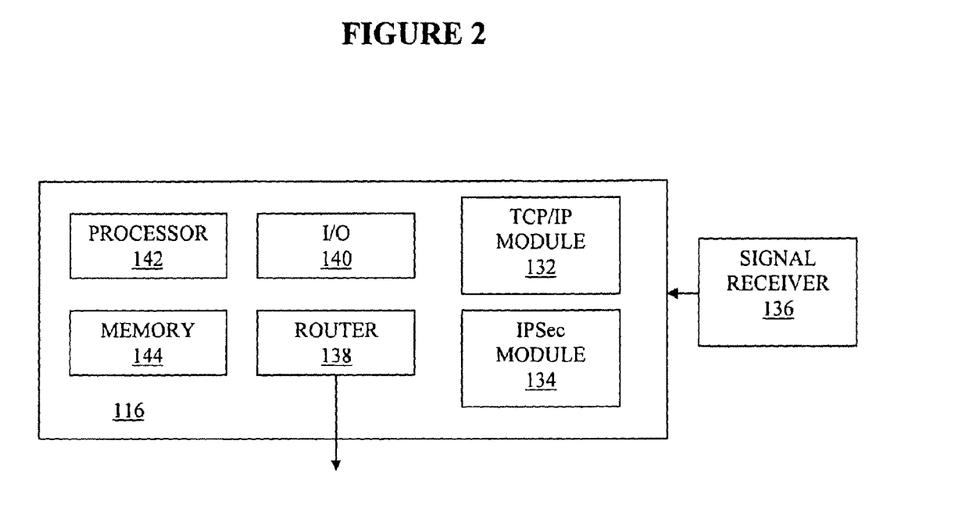
FIG. 2 is a block schematic illustration of a satellite receiver in accordance with the present disclosure.

Referring now to FIG. 2, a block schematic illustration of a receiver 116 in accordance with the present disclosure is shown. As shown, in one embodiment, the receiver 116 includes and operates in association with several standard commercially available software packages and protocols, including TCPIIP module 132 and IPSec module 134. The receiver 116 also makes use of certain commercially available hardware components, as shown in FIG. 2, including: a satellite dish, antenna or other similar signal receiver 136 for receiving the encrypted multicast communication transmitted by the network operations center 104, a network router 138, an input/output (I/O) 140, a processor 142 or microcontroller and a memory 144. It should be understand that this presents a single simplified embodiment, where alternative embodiments could use alternative software packages and protocols, as well as different or multiple hardware components. Download encrypted IP multicast communication packets are received by the signal receiver 136, which in turn communicates electronically with a hardware driver installed on the receiver 116 to interface with the signal receiver 136. The encrypted IP multicast communication packets next pass through the IPSec module 134 to be decrypted. After decryption, the TCPIIP 132 protocol stack receives the multicast information packets where they are either utilized by the receiver 116 or multicast to other devices connected to the receiver 116 through a router 138 or other network connection or peripheral device. In one embodiment, the receiver 116 may comprise a networked or standalone computer. Alternative embodiments of this invention may make use of other standard commercially available communication protocols, drivers, hardware and software.

IPSec protocol dictates that only unicast communications in a point-to-point transmission between a source and destination can be decrypted using IPSec protocol, where IPSec protocol normally dictates that other types of communications, such as multicast communications, should be discarded and not recognized by a device employing IPSec protocol decryption algorithms. Thus, in order to allow a receiver 116 having IPSec protocol decryption capabilities to receive the encrypted IP multicast communication, the IPSec module 134 must interpret the received communication to be a unicast communication being transmitted point-to-point from a destination solely to the address of the receiver 116.

Figure 3:
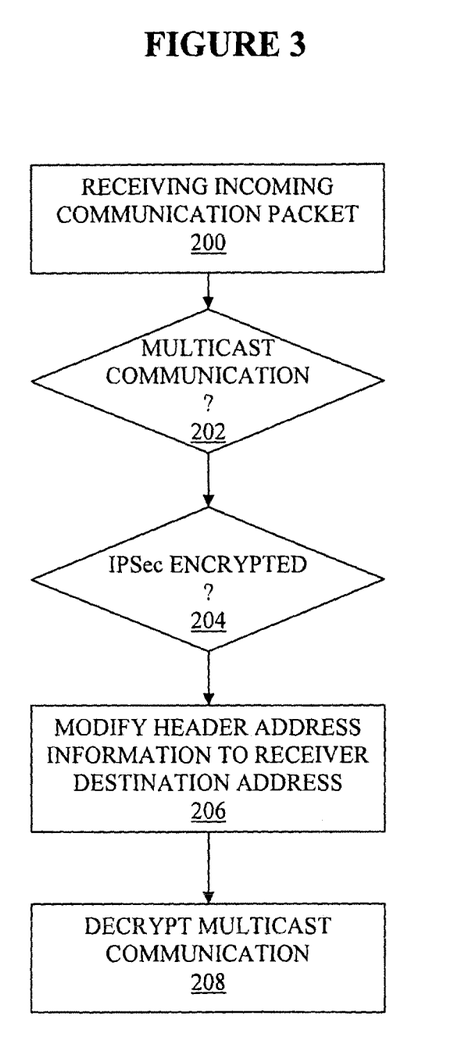
FIG. 3 is an operational flow diagram providing a functional overview for receiving an IPSec-encrypted multicast communication in accordance with the present disclosure

Referring now to FIG. 3, one embodiment of an operational flow diagram illustrating a method for receiving an IPSec-encrypted multicast communication in shown. Initially, an incoming satellite communication is received by the receiver 116 in process block 200. Next, a determination is made in query block 202 whether the received communication packet is a multicast communication. For instance, the IP header information in the communication packet can be analyzed to determine whether multicast address information is present. Next, a determination is made in query block 204 whether the received communication packet is IPSec-encrypted. For instance, the header information in the communication packet can again be analyzed to determine whether IPSec header information is present. If it is determined that the received communication packet is both a multicast communication and encrypted using IPSec protocol, then address information in the header of the received IP multicast communication packet is modified in process block 206 so that the packet appears to the IPSec module 134 as a unicast communication being transmitted directly to the address of the receiver 116. The IPSec module 134 will then accept the received communication packet and then decrypt the received IP multicast communication using IPSec protocol in process block 208. Alternatively, after accepting the received communication packet, the receiver 116 may forward the received IP multicast communication in its encrypted state to other peripheral devices 118 or networks 120.

Figure 4:
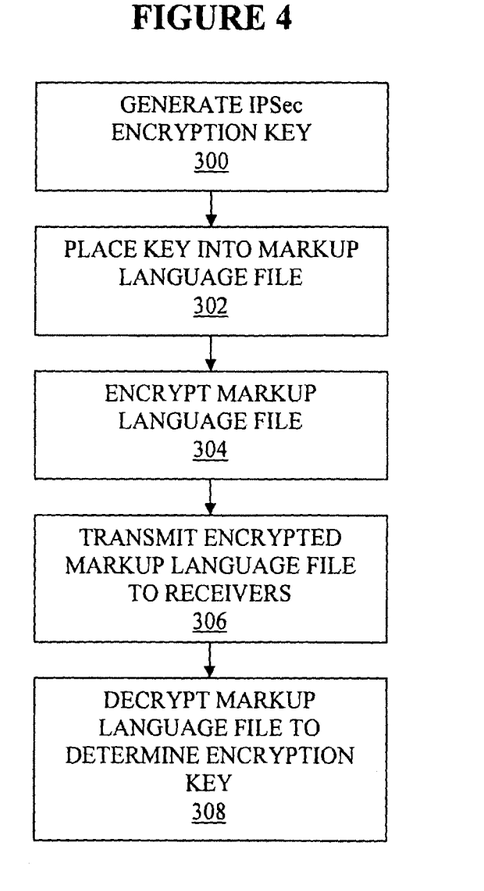
FIG. 4 is an operational flow diagram illustrating encryption key generation for a multicast communication in accordance with the present disclosure.

Referring now to FIG. 4, an operational flow diagram illustrating encryption key generation and encryption of a multicast communication is provided in accordance with one embodiment of the present disclosure. The keyserver 108 is provided on the transmission side of the satellite network. 100 for assigning and generating IPSec encryption keys for an IP multicast communication in process block 300. The assigned encryption keys must be communicated in a secure manner to selected receivers 116 on the receiving side of the satellite network 100 for subsequently decrypting the encrypted IP multicast communications being transmitted. In one embodiment, the present system is designed to work in one-way or unidirectional communication environments where round-trip IP communications are not available. In order to accomplish the initial key setup, which is typically handled through a public key private key exchange for conventional encryption techniques, the present system provides the initial keys in a secure method using one-way communication. In process block 302, the keyserver 108 then places the assigned encryption keys into a markup language file (e.g., XML, HTML or the like), where the markup language file is then encrypted in process block 304 using a predetermined key or encryption algorithm which will allow the selected receivers 116 to decrypt such encrypted file. The encrypted markup language file is then communicated to the selected receivers 116 in process block 306, such that the receivers will decrypt the encrypted markup language file in process block 308 to using the predetermined key or algorithm to extract the assigned keys from the markup language file. In this manner, IPSec encryption keys can be assigned and provided to the receivers 116 so that only those receivers 116 receiving the IPSec encryption keys will be capable of decrypting the IP multicast communication that has been encrypted with those same IPSec encryption keys. Further, this provides for the transmission of IPSec encryption keys in a secure one-way communication that does not require a back-and-forth two-way communication between the keyserver 108 and receivers 116.

In another embodiment, multiple keys are generated for a given IP address of a receiver 116 with each key being generated for a particular multicasting hierarchical classification. For example, content in an IP multicast communication be separated into a hierarchy of the IP address, broadcast channels and broadcast events by assigning different respective keys for each of the IP address, channels and events. Access to content directed to the IP address in general, using multicast communication, can appear within separate channels of the multicast communication, and can separate content to appear in events within each channel of the multicast communication and be controlled using the respectively assigned keys for such content. In this way, access to content in the IP multicast communication directed to the IP address in general will only be received by those receivers 116 having the key assigned to the IP address, access to content to appear within separate channels of the IP address of the multicast communication will only be received by those receivers 116 having the keys respectively assigned to the separate channels, and access to separate content to appear within different events contained within a particular channel of the multicast communication will only be received by those receivers 116 having the respectively assigned keys for such events. All keys may be extant on a receiver 116 at a given time, where only one of the keys is used at any given time by the gateway 110 to encrypt the multicast communication depending upon whether the content in the multicast communication is directed to the IP address, channels or events. Each receiver 116 will possess a set of possible keys for all or only a portion of the hierarchy of keys, such that transitions between multicast communications being encrypted with different keys will appear seamless at the receiver 116 and will result in no loss in communication. It should be understand that this presents a single simplified embodiment, where alternative embodiments could use alternative classification hierarchies other than IP address, channels and events.

By way of example, multimedia content, such as IP-based video and data streams, can be directed to an IP multicast address in a IP multicast communication, where an IP encryption key assigned to the IP multicast address can be forwarded to and used by selected receivers 116 having an address corresponding to the IP multicast address to decrypt the IP multicast communication. Within the IP multicast communication, different types of content can be assigned to different respective channels in the IP multicast communication, such that only a subset of receivers 116 will be entitled to receive content appearing on certain channels in the IP multicast communication. IP encryption keys can be assigned for each respective channel and forwarded to the desired subset of receivers 116 to be used to decrypt the channel content in the IP multicast communication. Still further, a number of events may exist within each channel, such a program that only runs for a certain period of time, where IP encryption keys can be assigned for each respective event and forwarded to a desired subset of receivers 116 to be used to decrypt the event content in the IP multicast communication. In this manner, the IP multicast communication may be received by all of the receivers 116, but only those receivers receiving a channel encryption key or an event encryption key will be able to decrypt the corresponding content for a channel or event contained in the IP multicast communication, while the remaining receivers without such encryption keys will not be able to access the same content.

In another embodiment, IPSec encryption keys may be assigned and changed by the keyserver 108 at configurable intervals. After the keyserver 108 assigns a new key, the new keys is communicated to the receivers 116 such that the new key can be utilized for decryption when the gateway 110 subsequently encrypts an IP multicast communication using the new key.

In another embodiment, receivers 116 can be grouped together into groups of receivers 116 intended to receive certain encryption keys. In this manner, when new keys are assigned by the keyserver 108, they will be communicated to the desired groups of receivers 116 that are intended to be able to receive the IP multicast communication. Configuration of a very large number of receivers 116 is accomplished in a much easier manner by grouping the receivers 116 and delivering encryption keys. to the groups of receivers 116 on a group-by-group basis, as opposed to having to keep track of every single receiver 116 entitled to receive the IP multicast communication and delivering an encryption key to each individual one of those receivers 116 on a case-by-case basis.

The groups available within the keyserver 108 can be nested so that the user has macro groups (e.g. North America) which is then made of up sub-groups (e.g. East, West, Central), which contain individual receivers 116 (e.g. Delaware, Maryland, Virginia, etc.). There is no theoretical limit to the number of nested levels that can established and used for groups. Keys can then be assigned simply to specific receivers 116 directly or if desired to any of the groups nested within the chain of groups. In one embodiment, after a group is authorized to receive the keys, an administrator can remove any member of that group and the system will automatically rotate the authorization keys and give the updated keys to the remaining members who are still authorized.

It should be understood that the present disclosure describes in detail using IPSec protocol to protect satellite communications. However, it is understood to those skilled in the art that the concepts of the present disclosure are also contemplated to be extended to allow IPSec protocol to be utilized with other types of IP multicast communications other than satellite communications. Such types of IP multicast communications may include, but are not limited to, DSL, Cable, Microwave, WiFi, WiMAX or any other IP compatible networking method.

The receivers 116 may correspond to addressable computer systems. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The present disclosure, as would be known to one of ordinary skill in the art could be produced in hardware or software, or in a combination of hardware and software. The system, or method, according to the present disclosure may be produced in a single computer system having separate elements or means for performing the individual functions or steps described or claimed or one or more elements or means combining the performance of any of the functions or steps disclosed or claimed, or may be arranged in a distributed computer system or information processing system or information processing unit, interconnected by any suitable means as would be known by one of ordinary skill in art.

The system and method described in the present disclosure are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The present disclosure is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium or product allowing a computer to read data, instructions, messages or message 'packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
generating, with a processor, a key to be used to encrypt and decrypt data for an IP multicast communication, wherein the IP multicast communication includes at least one event;
placing the generated key into a markup language file;
encrypting the markup language file including the generated key;
transmitting the encrypted markup language file to a plurality of receivers;
decrypting the encrypted markup language file at the receivers to determine the generated key;
encrypting each event using a different respective event encryption key; and
delivering each respective event encryption key for each event to a respective subset of the receivers.

2. The method of claim 1, wherein the markup language file is an Extensible Markup Language (XML) file.

3. The method of claim 1, wherein the key allows data to be encrypted and decrypted according to Internet Protocol Security (IPSec) protocol.

4. The method of claim 1, further comprising:
encrypting a communication using the generated key;
transmitting the encrypted communication to the receiver; and
decrypting the encrypted communication using the generated key.

5. A device for providing an encrypted key to a remote location, said device comprising:
a processor;
a memory;
a key server for generating a key to be used to encrypt and decrypt data for an IP multicast communication and for placing the generated key into a markup language file, wherein the IP multicast communication includes at least one event;
an encryption device for encrypting the markup language file including the generated key and encrypting each event using a different respective event encryption key;
a transmitter for transmitting the encrypted markup language file to a plurality of receivers and delivering each respective event encryption key for each event to a respective subset of the receivers; and
a decryption device decrypting the encrypted markup language file at the receivers to determine the generated key.

6. The device of claim 5, wherein the markup language file is an Extensible Markup Language (XML) file.

7. The device of claim 5, wherein the key allows data to be encrypted and decrypted according to Internet Protocol Security (IPSec) protocol.

8. The device of claim 1, wherein:
the encryption device further encrypts a communication using the generated key;
the transmitter further transmits the encrypted communication to the receiver; and
the decryption device further decrypts the encrypted communication using the generated key.

9. A non-transitory machine-readable medium having program instructions stored thereon executable by a processing unit for performing the steps of:
generating a key to be used to encrypt and decrypt data for an IP multicast communication, wherein the IP multicast communication includes at least one event;
placing the generated key into a markup language file;
encrypting the markup language file including the generated key;
transmitting the encrypted markup language file to a plurality of receivers;
decrypting the encrypted markup language file at the receivers to determine the generated key;
encrypting each event using a different respective event encryption key; and
delivering each respective event encryption key for each event to a respective subset of the receivers.

10. The non-transitory machine-readable medium of claim 9, wherein the markup language file is an Extensible Markup Language (XML) file.

11. The non-transitory machine-readable medium of claim 9, wherein the key allows data to be encrypted and decrypted according to Internet Protocol Security (IPSec) protocol.

12. The non-transitory machine-readable medium of claim 9, further comprising program instructions stored thereon executable by a processing unit for:
encrypting a communication using the generated key;
transmitting the encrypted communication to the receiver; and
decrypting the encrypted communication using the generated key.

13. A method of broadcasting a secure multicast communication, said method comprising:
assigning content to be delivered in various hierarchies in an IP multicast communication, the various hierarchies including at least broadcast channels;
assigning, with a processor, different encryption keys for each respective hierarchy of the IP multicast communication;
encrypting the content in the various hierarchies in the IP multicast communication using respectively assigned encryption keys;
transmitting the encryption keys for the various hierarchies of the IP multicast communication to a plurality of receivers intended to receive respective encryption keys;
transmitting the encrypted IP multicast communication to each of the receivers;
decrypting the content in the various hierarchies of the IP multicast communication at only those receivers having the respective encryption keys for such content, wherein the IP multicast communication includes at least one event;
encrypting each event using a different respective event encryption key; and
delivering each respective event encryption key for each event to a respective subset of the receivers.

14. The method of claim 13, comprising:
encrypting a first multicast communication using a first encryption key;
delivering the first encryption key to a plurality of receivers for decrypting the encrypted first multicast communication;
transmitting the encrypted first multicast communication to the plurality of receivers;
encrypting at least one additional multicast communication using at least one additional encryption key, wherein each additional multicast communication is encrypted with its own respective encryption key;
delivering the at least one additional encryption key to a subset of the plurality of receivers for decrypting the encrypted at least one additional multicast communication;
transmitting the encrypted at least one additional multicast communication to the plurality of receivers, wherein all of the plurality of receivers having the first encryption key will be capable of decrypting the encrypted first multicast communication while only the subset of the plurality of receivers having the at least one additional encryption key will be capable of decrypting the encrypted additional multicast communication.

15. The method of claim 13, wherein each multicast communication includes at least one broadcast channel, the method further comprising:
encrypting each broadcast channel using a different respective channel encryption key; and
delivering each respective channel encryption key for each broadcast channel to a respective subset of the plurality of channels.

16. The method of claim 15, wherein each wherein each broadcast channel of a multicast communication includes at least one event.

17. The method of claim 16, further comprising:
transmitting the at least one broadcast channel and the at least one event to respective subsets of receivers, wherein a key hierarchy is formed such that:

all of the plurality of receivers having the first encryption key will be capable of decrypting the encrypted first multicast communication, only the subsets of the plurality of receivers having the respective channel encryption keys will be capable of further decrypting the encrypted at least one broadcast channel, and only the further subsets of the plurality of channel-receiving receivers having the respective event encryption keys will be capable of further decrypting the encrypted at least one event.

18. The method of claim 17, wherein each event encryption key is only valid for a predetermined period of time associated with the transmitted event.

19. A method of broadcasting a secure multicast communication, said method comprising:

assigning content to be delivered in various hierarchies in an IP multicast communication, the various hierarchies including at least broadcast channels;

assigning, with a processor, different encryption keys for each respective hierarchy of the IP multicast communication;

encrypting the content in the various hierarchies in the IP multicast communication using respectively assigned encryption keys;

transmitting the encryption keys for the various hierarchies of the IP multicast communication to a plurality of receivers intended to receive respective encryption keys;

transmitting the encrypted IP multicast communication to each of the receivers;

decrypting the content in the various hierarchies of the IP multicast communication at only those receivers having the respective encryption keys for such content, wherein the IP multicast communication includes at least one event; and encrypting each event using a different respective event encryption key, wherein each event encryption key is only valid for a predetermined period of time associated with a transmitted event.

20. A method comprising:

generating, with a processor, a key to be used to encrypt and decrypt data for an IP multicast communication, wherein the IP multicast communication includes at least one event;

placing the generated key into a markup language file;

encrypting the markup language file including the generated key;

transmitting the encrypted markup language file to a receiver; and decrypting the encrypted markup language file at the receiver to determine the generated key; and encrypting each event using a different respective event encryption key, wherein each event encryption key is only valid for a predetermined period of time associated with a transmitted event.

21. A device for providing an encrypted key to a remote location, said device comprising:

a processor;

a memory;

a key server for generating a key to be used to encrypt and decrypt data for an IP multicast communication and for placing the generated key into a markup language file, wherein the IP multicast communication includes at least one event;

an encryption device for encrypting the markup language file including the generated key and encrypting each event using a different respective event encryption key, wherein each event encryption key is only valid for a predetermined period of time associated with a transmitted event;

a transmitter for transmitting the encrypted markup language file to a receiver; and a decryption device decrypting the encrypted markup language file at the receiver to determine the generated key.

22. A non-transitory machine-readable medium having program instructions stored thereon executable by a processing unit for performing the steps of:

generating a key to be used to encrypt and decrypt data for an IP multicast communication, wherein the IP multicast communication includes at least one event;

placing the generated key into a markup language file;

encrypting the markup language file including the generated key;

transmitting the encrypted markup language file to a receiver; and decrypting the encrypted markup language file at the receiver to determine the generated key; and encrypting each event using a different respective event encryption key, wherein each event encryption key is only valid for a predetermined period of time associated with a transmitted event.

* * * * *